(12) United States Patent  
Michels

(10) Patent No.: US 10,963,844 B2  
(45) Date of Patent: Mar. 30, 2021

(54) SYSTEMS AND METHODS FOR AUTOMATED SETUP OF VIDEO CONFERENCING RESOURCES

(71) Applicant: Facebook, Inc., Menlo Park, CA (US)

(72) Inventor: Konrad Horst Michels, Los Gatos, CA (US)

(73) Assignee: Facebook, Inc., Menlo Park, CA (US)

(*) Notice: Subject to any disclaimer, the term of this patent is extended or adjusted under 35 U.S.C. 154(b) by 179 days.

(21) Appl. No.: 15/269,709

(22) Filed: Sep. 19, 2016

(65) Prior Publication Data

US 2018/0082263 A1 Mar. 22, 2018

(51) Int. Cl.
- *G06Q 10/10* (2012.01)
- *H04L 29/08* (2006.01)
- *H04L 29/06* (2006.01)
- *H04W 4/80* (2018.01)

(52) U.S. Cl.
CPC ....... *G06Q 10/1095* (2013.01); *H04L 65/403* (2013.01); *H04L 67/18* (2013.01); *H04L 67/306* (2013.01); *H04W 4/80* (2018.02)

(58) Field of Classification Search
CPC ... G06Q 10/1095; H04L 67/18; H04L 67/306; H04L 65/403; H04W 4/80
See application file for complete search history.

(56) References Cited

U.S. PATENT DOCUMENTS

| | | | |
|---|---|---|---|
| 8,842,153 B2* | 9/2014 | Ranganath | H04M 3/565 348/14.01 |
| 9,357,352 B1* | 5/2016 | Alharayeri | H04W 4/21 |
| 2009/0327227 A1* | 12/2009 | Chakra | G06Q 10/10 707/999.003 |
| 2010/0315483 A1* | 12/2010 | King | H04N 7/147 348/14.08 |
| 2011/0149809 A1* | 6/2011 | Narayanaswamy | H04L 12/1818 370/260 |
| 2012/0185291 A1* | 7/2012 | Ramaswamy | G06Q 10/1095 705/7.19 |
| 2013/0096813 A1* | 4/2013 | Geffner | H04W 4/02 701/117 |
| 2014/0330904 A1* | 11/2014 | Jackson | H04L 67/18 709/204 |
| 2015/0110259 A1* | 4/2015 | Kaye | H04M 3/56 379/202.01 |

* cited by examiner

*Primary Examiner* — Nadja N Chong Cruz

(74) *Attorney, Agent, or Firm* — Sheppard Mullin Richter & Hampton LLP

(57) ABSTRACT

Systems, methods, and non-transitory computer-readable media can receive meeting scheduling information comprising meeting time information, participant information, and resource information. A scheduled meeting is created based on the meeting scheduling information. Participant location information is determined based on user location technology. The scheduled meeting is automatically initiated based on meeting initiation criteria, the meeting initiation criteria comprising participant location criteria.

15 Claims, 7 Drawing Sheets

SYSTEMS AND METHODS FOR AUTOMATED SETUP OF VIDEO CONFERENCING RESOURCES

FIELD OF THE INVENTION

The present technology relates to the field of scheduling and conferencing systems. More particularly, the present technology relates to automated setup of video conferencing systems and resources.

BACKGROUND

Today, video conferencing systems allow users to conduct meetings with people even if they are in different locations. Many businesses will have one or more video conference rooms that are designed to facilitate video conferences. A video conference room will generally include one or more video input devices (e.g., an HDMI port to connect a computer, or one or more cameras to capture a video feed of the video conference room), one or more displays (e.g., to display a presentation or to display video feeds of other video conference rooms), and network connection capabilities to connect video conference rooms to one another (e.g., an Internet connection).

SUMMARY

Various embodiments of the present disclosure can include systems, methods, and non-transitory computer readable media configured to receive meeting scheduling information comprising meeting time information, participant information, and resource information. A scheduled meeting is created based on the meeting scheduling information. Participant location information is determined based on user location technology. The scheduled meeting is automatically initiated based on meeting initiation criteria, the meeting initiation criteria comprising participant location criteria.

In an embodiment, the participant location criteria comprises a requirement that one or more participants be located within a resource associated with the scheduled meeting.

In an embodiment, it is determined that a first participant is unlikely to be on time to the scheduled meeting based on participant location information associated with the first participant.

In an embodiment, the first participant is notified of a first available resource proximate the first participant, based on the determining that the first participant is unlikely to be on time to the scheduled meeting.

In an embodiment, the scheduled meeting is revised to include the first available resource proximate the first participant.

In an embodiment, a second participant is notified that the first participant is unlikely to be on time to the scheduled meeting based on the determining that the first participant is unlikely to be on time to the scheduled meeting.

In an embodiment, the participant location criteria comprises a requirement that a meeting organizer be located within a resource associated with the scheduled meeting.

In an embodiment, the automatically initiating the scheduled meeting comprises automatically connecting resources associated with the scheduled meeting without additional user identification of resources.

In an embodiment, the scheduled meeting is automatically terminated based on meeting termination criteria.

In an embodiment, the user location technology comprises a low-energy Bluetooth beacon.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
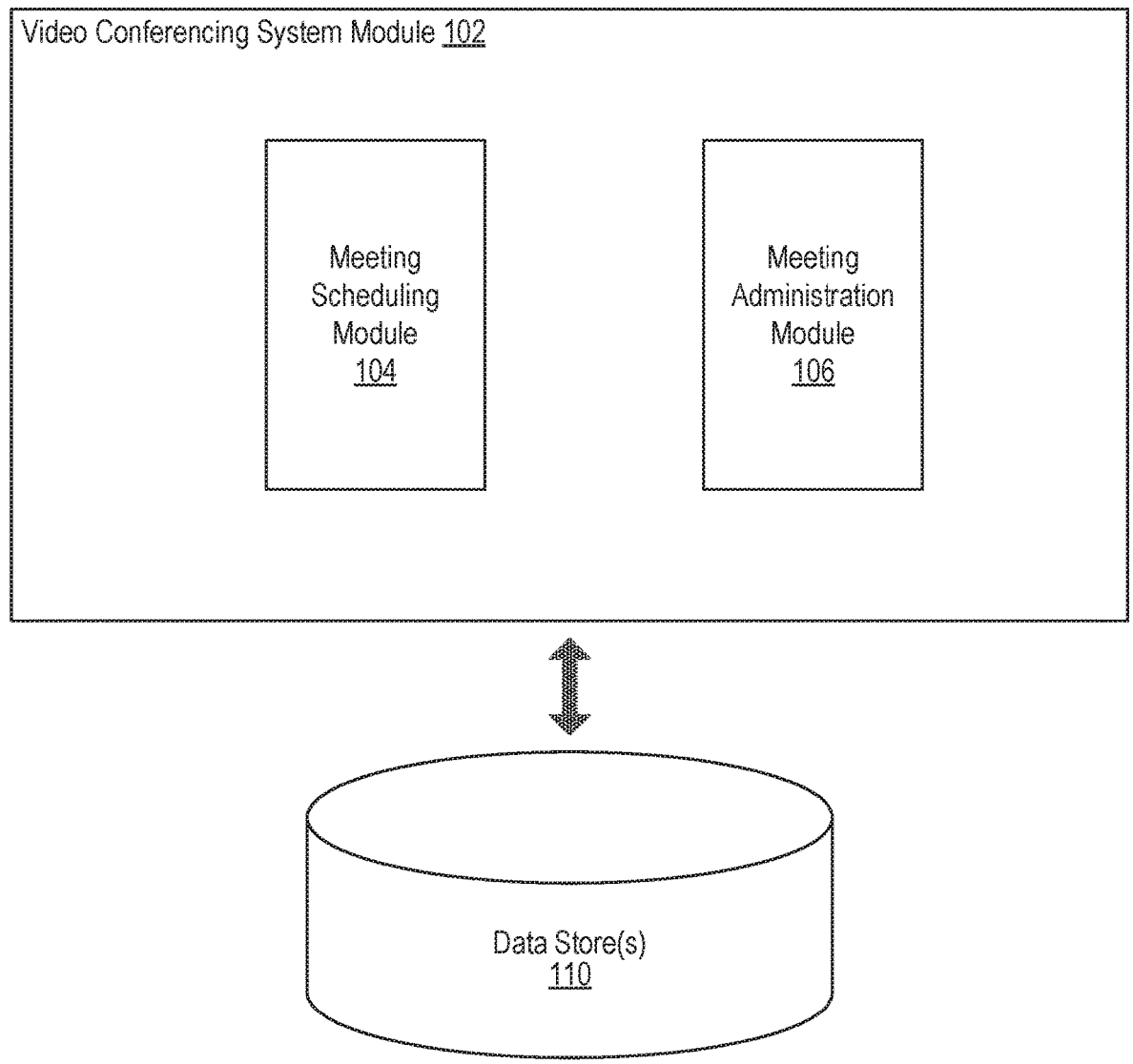
FIG. 1 illustrates an example system including a video conferencing system module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Automated Setup of Video Conferencing Resources

People use computing devices (or systems) for a wide variety of purposes. Computing devices can provide different kinds of functionality. Users can utilize their computing devices to produce information, access information, and share information. In some instances, a user can utilize computing devices to schedule and carry out video conferences with other users. Video conferencing systems allow users to conduct meetings with other participants in different locations. Many businesses will have one or more video conference rooms that are designed to facilitate video conferences. A video conference room will generally include one or more video input devices (e.g., an HDMI port to connect a computer, or one or more cameras to capture a video feed of the video conference room), one or more displays (e.g., to display a presentation or to display video feeds from other video conference rooms), and network connection capabilities to connect video conference rooms to one another (e.g., an Internet connection).

A meeting organizer may use a software application running on a computing device to create, or schedule, meetings through a calendaring system. For example, when creating the meeting, the meeting organizer can identify participants (e.g., by using e-mail addresses or social network profiles) to be invited to the meeting, the meeting time period, dial-in information for participants that will be teleconferencing, one or more locations (e.g., video conference rooms) at which the meeting is to be held, video conference information to connect one or more video conference rooms to one another, and the types of resources that are needed for the meeting (e.g., one or more conference rooms, projectors, audio/video systems, computing resources, etc.). In general, the calendaring system can maintain a separate calendar for each resource that can be requested through the calendaring system. These corresponding calendars can assist the calendaring system, and also users of the calendaring system, to determine whether a particular resource is available for reservation. In one example, the calendaring system may receive a meeting request to reserve a first video conference room in a first location, and a second video conference room in a second location, for a particular time period. In this example, the calendaring system is able to determine whether the first video conference room is available for the particular time period by accessing the calendar corresponding to the first video conference room. Similarly, the calendaring system is able to determine whether the second video conference room is available for the particular time period by accessing the calendar corresponding to the second video conference room.

Once the meeting has been created, the calendaring system will typically add a calendar event that corresponds to the meeting in the respective calendars of the various meeting participants. Further, the calendaring system also adds the calendar event in the respective calendars of any resources (e.g., video conference rooms) that were reserved when creating the meeting. When it comes time for the scheduled meeting, meeting participants will generally gather in the one or more reserved video conference rooms, and initiate any connections that are required for the meeting (e.g., connecting the various video conference rooms to one another, dialing telephonic dial-in information, etc.). However, users who are not familiar with the technical details of the particular video conference room in which they are meeting, or of video conferencing systems in general, may have difficulty initiating the meeting.

In order to avoid such situations, businesses often utilize IT or other personnel to set up each and every meeting. This can require such personnel to run from one conference room to another to set up various meetings, which is generally an inefficient use of an employee's time. Furthermore, given the limited number of employees available to carry out such tasks, if many different meetings are scheduled in at the same time, certain meetings may be delayed due to the lack of available employees to perform meeting setup tasks. This is particularly true where one or more meetings experience technical issues, which require more time and attention. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. Based on computer technology, the disclosed technology can automatically determine the resources required for a scheduled meeting and, at the appropriate time, automatically perform setup tasks to initiate the scheduled meeting. In certain embodiments, a video conferencing system can determine the participants of a scheduled meeting, and the reserved resources of a scheduled meeting (e.g., a first video conference room, and a second video conference room). At the time of the scheduled meeting, the video conferencing system can utilize participant location information to determine whether or not to initiate the scheduled meeting, and can automatically perform all required tasks to initiate the scheduled meeting, e.g., automatically connecting all resources that have been reserved for the scheduled meeting. Furthermore, in certain embodiments, the video conferencing system can perform on-the-fly adjustment of resources. For example, based on participant location information, the video conferencing system can determine the nearest available video conference room, and can automatically connect the video conference room to the meeting, even if it was not an originally scheduled resource.

FIG. 1 illustrates an example system 100 including an example video conferencing system module 102 configured to schedule and administer video conference meetings, according to an embodiment of the present disclosure. As shown in the example of FIG. 1, the video conferencing system module 102 can include a meeting scheduling module 104 and a meeting administration module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The video conferencing system module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the video conferencing system module 102 can be implemented, in part or in whole, as software running on one or more computing devices or systems, such as on a server computing system or a user (or client) computing system. For example, the video conferencing system module 102 or at least a portion thereof can be implemented as or within an application (e.g., app), a program, or an applet, etc., running on a user computing device or a client computing system, such as the user device 610 of FIG. 6. In another example, the video conferencing system module 102 or at least a portion thereof can be implemented using one or more computing devices or systems that include one or more servers, such as network servers or cloud servers. In some instances, the video conferencing system module 102 can, in part or in whole, be implemented within or configured to operate in conjunction with a social networking system (or service), such as the social networking system 630 of FIG. 6. It should be understood that there can be many variations or other possibilities.

The video conferencing system module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the video conferencing system module 102. For example, the data store 110 can store a database of participants, a database of resources, one or more calendars, each calendar associated with a resource, a participant, or other entity, and the like. It is contemplated that there can be many variations or other possibilities.

The video conferencing system module 102 can be configured to interact with a calendaring system through which meetings can be scheduled. The calendaring system can maintain a separate calendar for each user as well as each resource that is available to be reserved through the calendaring system. The meeting scheduling module 104 can schedule meetings through the calendaring system based in part on parameters that are specified by one or more meeting organizers. For example, a meeting organizer may use a software application running on a computing device to create, or schedule, a meeting through the calendaring system. To create a meeting, the meeting organizer can identify (e.g., by e-mail addresses or a profile on a social networking system) any required and/or optional participants to be invited to the meeting, the meeting time period, dial-in information for participants that will be teleconferencing, one or more locations at which the meeting is to be held, and the types of resources that are needed for the meeting (e.g., one or more video conference rooms, projectors, computing resources, etc.). Assuming the resources requested for the meeting are available, the meeting scheduling module 104 can interact with the calendaring system to create a calendar event based in part on the specified parameters. Once the meeting has been created, the calendaring system will typically add the calendar event in the calendar of the meeting organizer(s). Users that were specified as participants of the meeting will typically receive electronic invitations for the meeting. Once these invitations are accepted, the calendar event will typically be inserted in the calendars of each of the participants that accepted the meeting invite. Further, the calendaring system can also add the calendar event in the respective calendars of any resources (e.g., conference rooms) that were reserved when creating the meeting.

The meeting administration module 106 can be configured to perform all tasks required to administer a scheduled meeting. This can include, for example, initiating a meeting at the appropriate time by connecting resources required for the meeting, and then terminating the meeting at the appropriate time by disconnecting said resource. For example, a meeting organizer can schedule a meeting for a particular time, and can specify that the meeting will require a first video conference room, a second video conference room, and a telephonic dial-in line for participants who cannot be in the first or second video conference rooms and wish to dial-in. The meeting administration module 106 can be configured to, at the appropriate time, automatically connect the first and second video conference rooms to one another, and also to dial into the telephone dial-in line from the first and second video conference rooms so that those rooms can be connected to any dial-in participants. Once the meeting is over, the meeting administration module 106 can be configured to disconnect these resources. It should be understood that the terms "automatic" or "automatically," as used herein, may not be completely devoid of any user action at all. Users may still have to initiate an action, e.g., by pressing a button to "connect," but the user does not have to manually enter dial-in information, or video conference ID information, as may be required by conventional systems. By performing these tasks automatically, meeting participants and/or IT personnel are not required to spend time setting up and breaking down each and every meeting. The meeting administration module 106 is discussed in greater detail herein.

Figure 2:
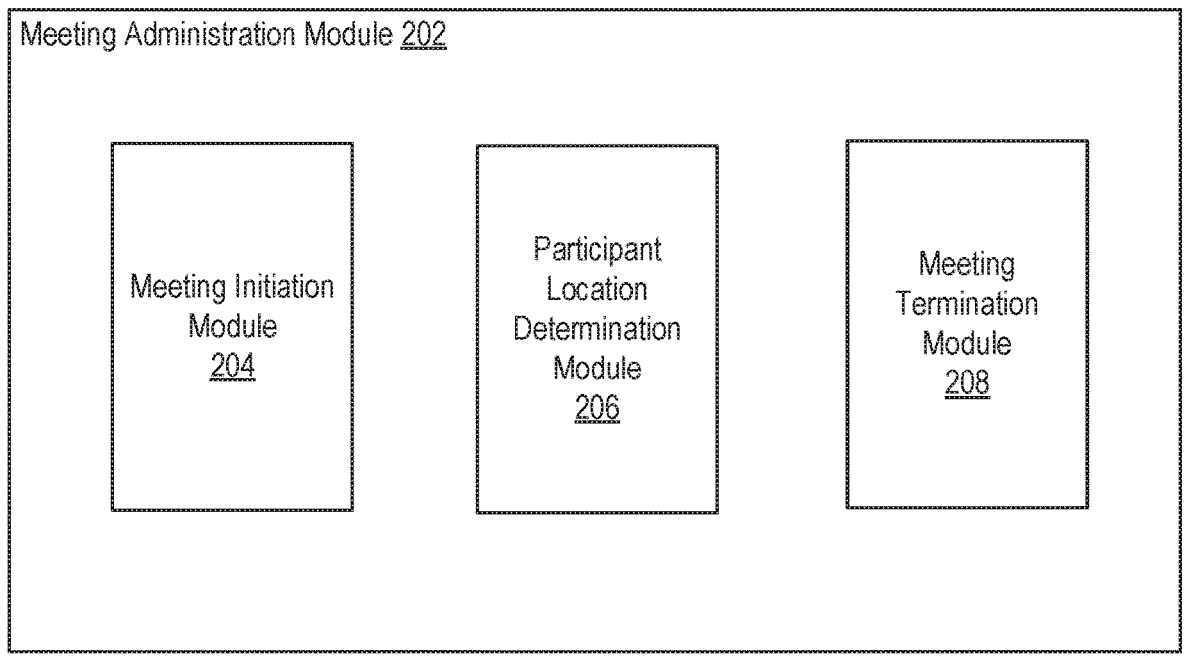
FIG. 2 illustrates an example meeting administration module, according to an embodiment of the present disclosure.

FIG. 2 illustrates an example meeting administration module 202 configured to automatically administer scheduled meeting, according to an embodiment of the present disclosure. In some embodiments, the meeting administration module 106 of FIG. 1 can be implemented as the example meeting administration module 202. As shown in FIG. 2, the meeting administration module 202 can include a meeting initiation module 204, a participant location determination module 206, and a meeting termination module 208.

The meeting initiation module 204 can be configured to automatically connect necessary resources to initiate a scheduled meeting. As discussed above, when a meeting organizer schedules a meeting, the meeting organizer can specify any resources that will be required for the meeting. The meeting initiation module 204 can be configured to automatically connect resources to initiate a meeting based on various meeting initiation criteria. For example, meeting initiation criteria can include a time component, such that resources are connected at a scheduled meeting time. Meeting initiation criteria can also include various other components. In certain embodiments, users may be required to request initiation of a meeting by taking a particular action (e.g., pressing a "connect to meeting" button). In another example, meeting initiation criteria can also be based on participant location information, such that initiation of a meeting is based on the location of one or more meeting participants.

The participant location determination module 206 can be configured to collect participant location information. Participant location information can, in certain embodiments, be used in meeting setup and initiation. For example, meeting initiation can be based on the presence of one or more meeting organizers, or the presence of a pre-defined number of participants (e.g., a majority or quorum), within a reserved meeting resource (e.g., a video conference room). Participant location information can be determined in a variety of ways. For example, in some embodiments, conference rooms can include a low-energy Bluetooth beacon to identify users that are in each conference room. The Bluetooth beacon can be configured to communicate with mobile devices, each mobile device being associated with a particular user or participant. A mobile device can provide user identification information to the Bluetooth beacon, and the Bluetooth beacon can use this information to identify which users are currently located within the conference room. In certain embodiments, identification of a user associated with a mobile device may be based on a social network profile of a user logged into a social network on the mobile device. Other user locating technologies can also be used alone or in conjunction with one another to provide as much user location information as needed. For example, Bluetooth beacons can be used to determine a user's precise location within a particular building, while geo-fencing technology or near-field communications can be used to determine a user's location in a particular area or region, and GPS can be used to determine a user's general vicinity.

User identification and location information determined based on user locating technologies can be provided to a video conferencing system to determine which participants of a scheduled meeting are present or not yet present in one or more reserved conference rooms. The meeting administration module 202 can be configured to utilize participant location information to initiate a scheduled meeting based on participant location criteria. For example, a scheduled meeting can begin once the start time for the scheduled meeting has been reached and the meeting organizer is present in a reserved conference room, or once a quorum of meeting participants are present in reserved conference rooms. A meeting can be initiated automatically (e.g., by connecting resources to one another) once meeting initiation criteria have been satisfied. The participant location determination module 206 is discussed in greater detail herein.

The meeting termination module 208 can be configured to automatically terminate a meeting based on meeting termination criteria. A scheduled meeting can be terminated by severing the connection between meeting resources (e.g., disconnecting conference rooms from one another, disconnecting a teleconference line, etc.). Similar to the meeting initiation criteria discussed above, in certain embodiments, meeting termination criteria can be based on time criteria, such as ending a meeting at a pre-determined time. Meeting termination criteria can also be based on participant location criteria, e.g., utilizing user locating technology to determine participant location, and ending a meeting once a meeting organizer leaves a conference room, or once a majority of participants leave conference rooms. When a meeting is about to be terminated, the video conferencing system can provide participants with a warning that the meeting will be terminated, and give remaining participants the option to continue the meeting. If no response is received, then the connected resources can be disconnected and the meeting terminated.

Figure 3:
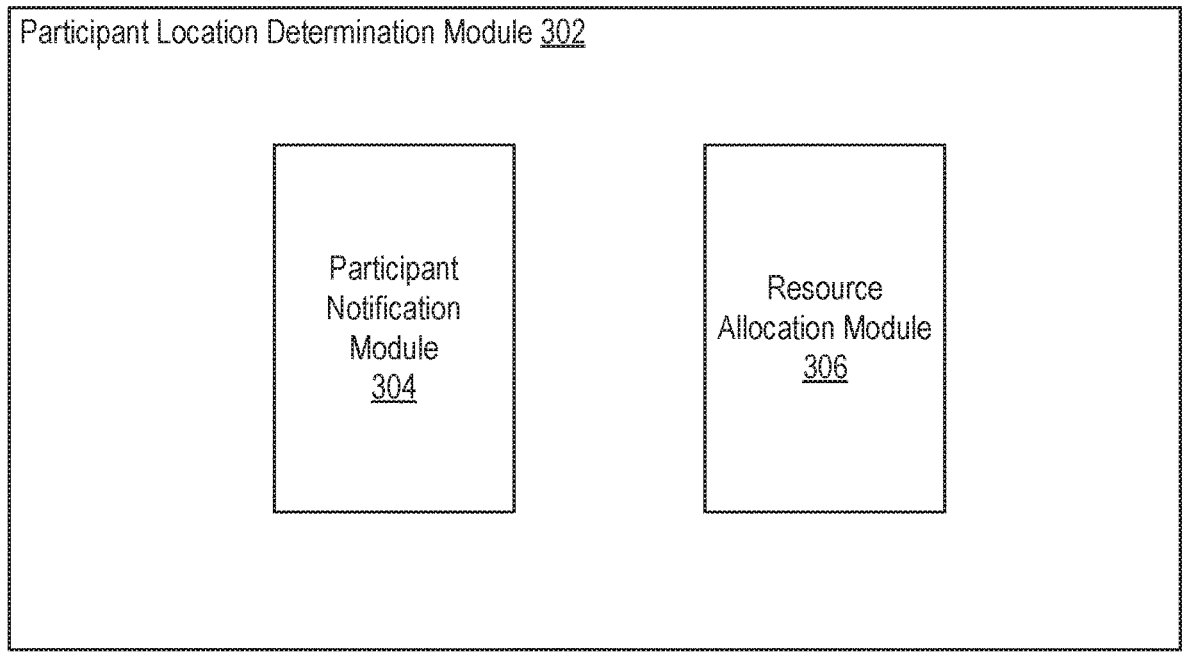
FIG. 3 illustrates an example participant location determination module, according to an embodiment of the present disclosure.

FIG. 3 illustrates an example participant location determination module 302 configured to determine participant location, and take various actions based on participant location information, according to an embodiment of the present disclosure. In some embodiments, the participant location determination module 206 of FIG. 2 can be implemented as the example participant location determination module 302. As shown in FIG. 3, the participant location determination module 302 can include a participant notification module 304, and a resource allocation module 306.

As discussed above, the participant location determination module 302 can be configured to provide participant location information to a video conferencing system to assist in meeting administration, including meeting initiation and termination. In addition to these functions, the participant location determination module 302 can also be configured to assist participants by providing notifications of scheduled meetings, and also re-allocating meeting resources based on participant location information. The participant notification module 304 can be configured to provide notifications to participants of scheduled meetings. In certain embodiments, such notifications can be based on participant location information. For example, consider a scenario in which a meeting is scheduled for noon, and the meeting includes participants in a company's London office and the company's Los Angeles office. In order to connect these participants, the scheduled meeting includes a reservation of a conference room in London and a reservation of a conference room in Los Angeles. The participant notification module 304 can notify a first participant, located in London, that the noon meeting is approaching, and, upon determining that the participant is located in London, provide the details of the London conference room so that the participant can make his or her way to the room in time for the meeting. However, if the participant notification module 304 determines that the meeting is scheduled to take place in fifteen minutes, but the participant is more than fifteen minutes away from the reserved London conference room, then the participant notification module 304 can be configured to take various actions based on this information. For example, the participant notification module 304 can inform the participant that the participant is unlikely to make it to the reserved conference room on time, and ask if the participant would like to inform the other participants that they will be late. If the participant elects to do so, the participant notification module 304 can inform other participants that the first participant will be late.

In another example, the participant notification module 304 can ask the first participant if he or she would like to see available conference rooms nearby, so that the first participant can step into an unused conference room and make it to the meeting on time. The resource allocation module 306 can be configured to determine available resources, and make a recommendation to a participant of available resources based on the participant's location information. In the example discussed above, if there is a nearby conference room available, the resource allocation module 306 can reserve the nearby conference room, and add the conference room to the scheduled meeting so that it is connected to other meeting resources that were previously reserved for the scheduled meeting.

In certain embodiments, resources can also be released based on participant location information. For example, if the first participant was the only participant that was scheduled to be present in the originally reserved London conference room, and the first participant has now requested a new London conference room that is more nearby, then the video conferencing system can automatically reserve and connect the new, nearby London conference room, and also release the originally scheduled London conference room so that it can potentially be utilized by another user.

Figure 4:
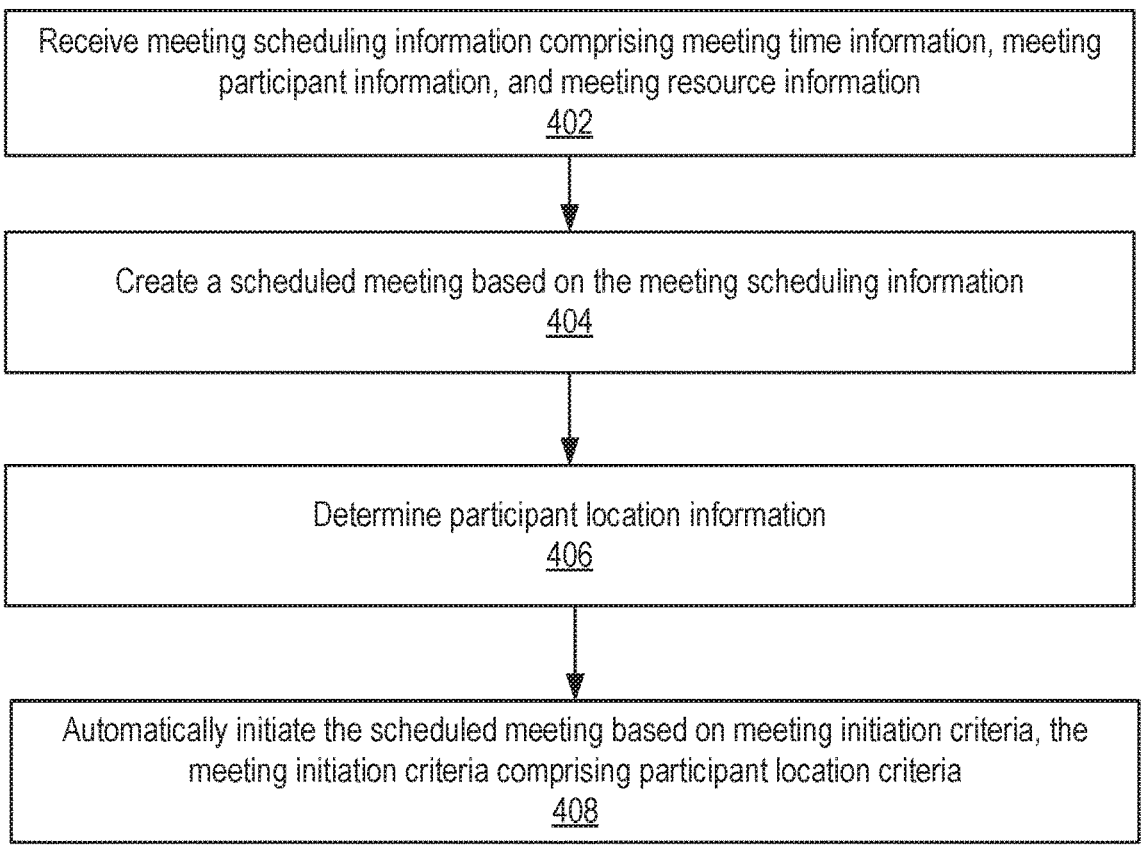
FIG. 4 illustrates an example method for automatic initiation of a scheduled meeting, according to an embodiment of the present disclosure.

FIG. 4 illustrates an example method 400 associated with automatic initiation of a scheduled meeting, according to an embodiment of the present disclosure. It should be appreciated that there can be additional, fewer, or alternative steps performed in similar or alternative orders, or in parallel, based on the various features and embodiments discussed herein unless otherwise stated.

At block 402, the example method 400 can receiving meeting scheduling information comprising meeting time information, meeting participant information, and meeting resource information. At block 404, the example method 400 can create a scheduled meeting based on the meeting scheduling information. At block 406, the example method 400 can determine participant location information. At block 408, the example method 400 can automatically initiate the scheduled meeting based on meeting initiation criteria, the meeting initiation criteria comprising participant location criteria.

Figure 5:
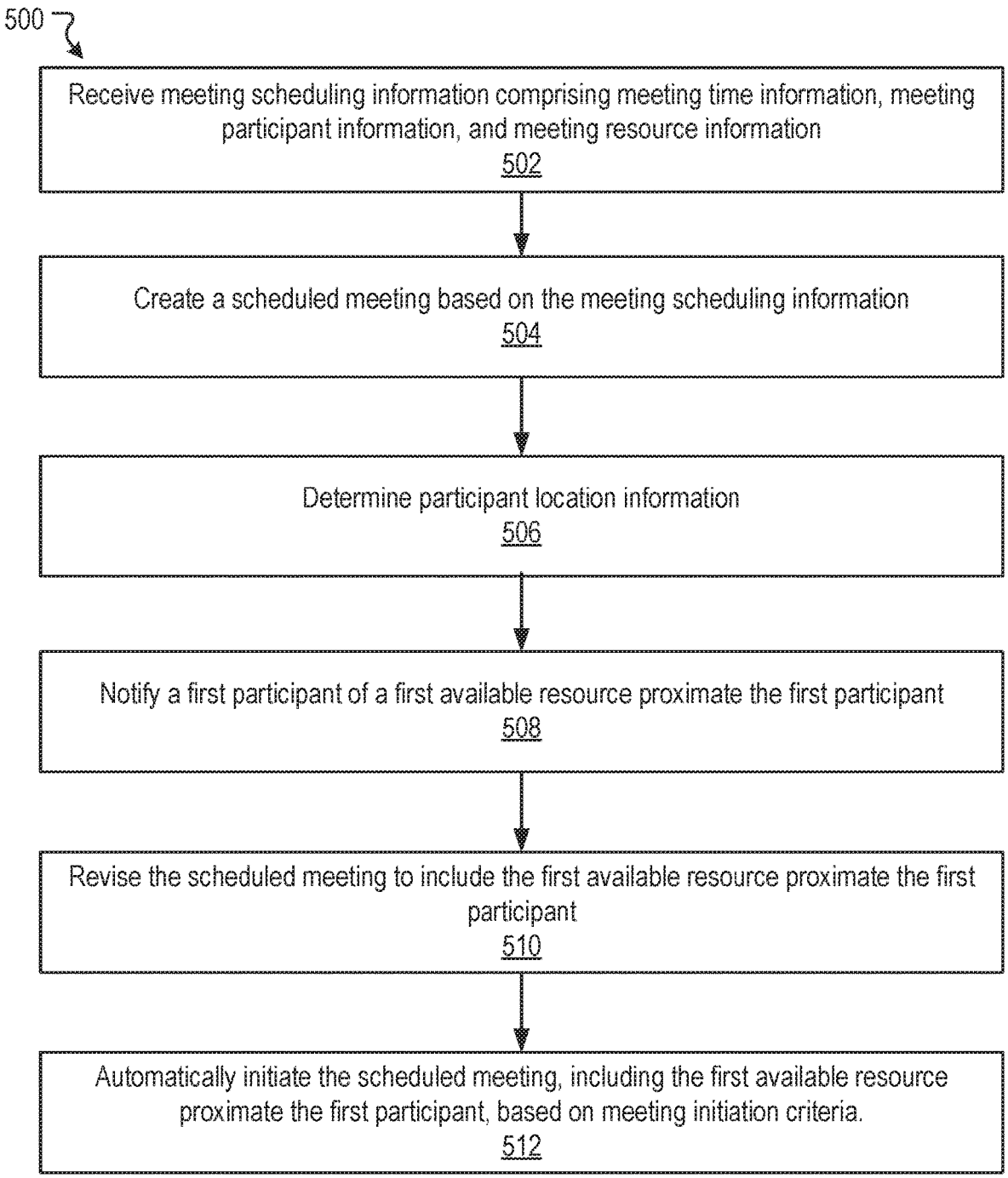
FIG. 5 illustrates an example method for automatic reallocation of meeting resources, according to an embodiment of the present disclosure.

FIG. 5 illustrates an example method 500 associated with automatic reallocation of meeting resources, according to an embodiment of the present disclosure, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can receive meeting scheduling information comprising meeting time information, meeting participant information, and meeting resource information. At block 504, the example method 500 can create a scheduled meeting based on the meeting scheduling information. At block 506, the example method 500 can determine participant location information. At block 508, the example method 500 can notify a first participant of a first available resource proximate the first participant. At block 510, the example method 500 can revise the scheduled meeting to include the first available resource proximate the first participant. At block 512, the example method 500 can automatically initiate the scheduled meeting, including the first available resource proximate the first participant, based on meeting initiation criteria.

Social Networking System—Example Implementation

Figure 6:
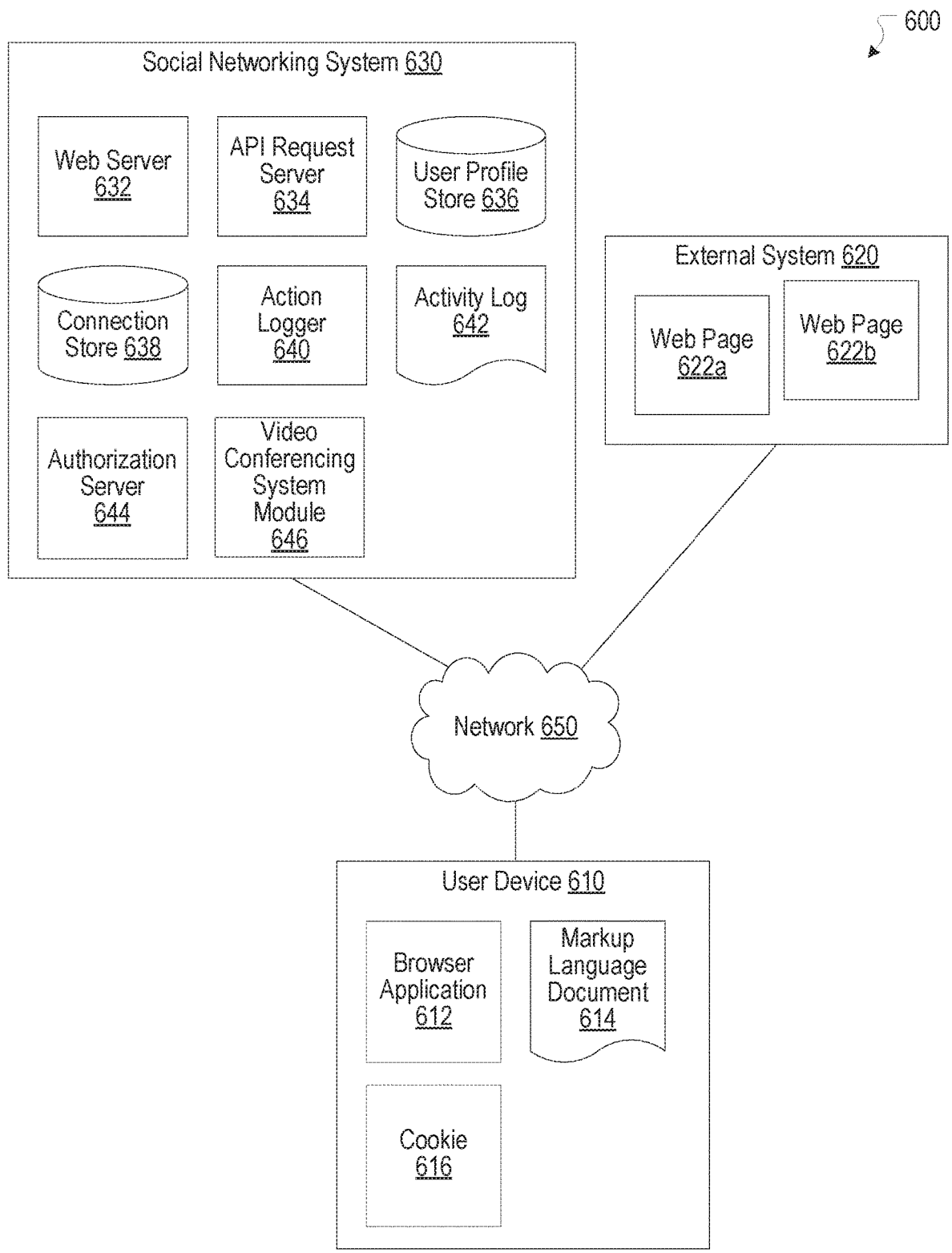
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a video conferencing system module 646. The video conferencing system module 646 can, for example, be implemented as the video conferencing system module 102, as discussed in more detail herein. As discussed previously, it should be appreciated that there can be many variations or other possibilities. For example, in some embodiments, one or more functionalities of the video conferencing system module 646 can be implemented in the user device 610.

Hardware Implementation

Figure 7:
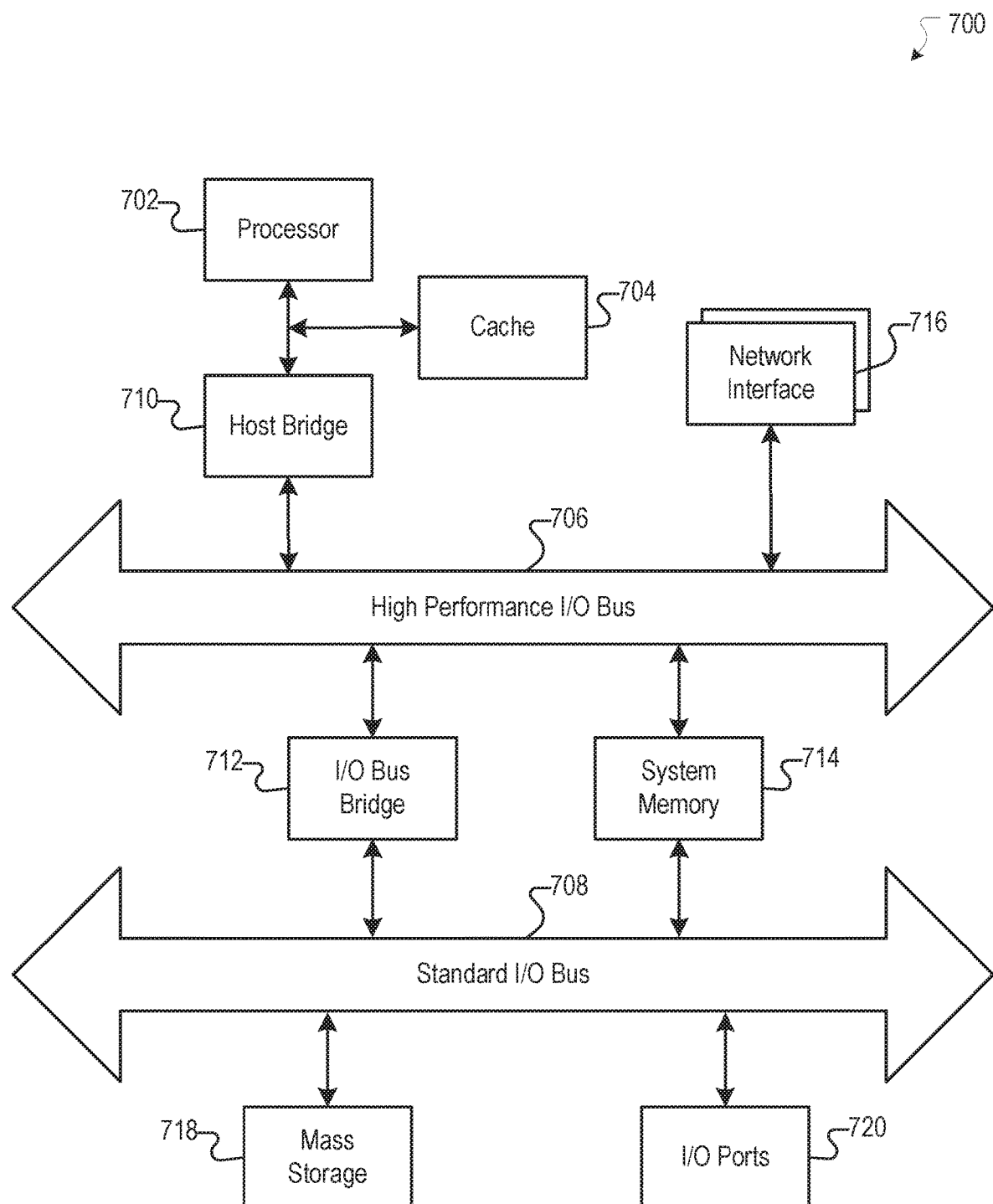
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving, by a computing system, meeting scheduling information from a meeting organizer, the meeting scheduling information comprising meeting time information, participant information, and resource information;
    creating, by the computing system, a scheduled meeting based on the meeting scheduling information in calendars of the meeting organizer and one or more participants for the scheduled meeting;
    determining, by the computing system, that the one or more participants are in one or more meeting resources using participant location information, the determining that the one or more participants are in the one or more meeting resources using the participant location information comprising:
        identifying, through a beacon, mobile devices corresponding to the one or more participants, and
        receiving, through the beacon, user identification information from the mobile devices, wherein the user identification information is based on profiles associated with the one or more participants;
    determining, by the computing system, a presence of the meeting organizer in the one or more meeting resources based on the participant location information;
    automatically initiating, by the computing system, the scheduled meeting by connecting a first resource associated with the scheduled meeting with a second resource associated with the scheduled meeting;
    determining, by the computing system, that a selected number of the one or more participants has left the one or more meeting resources based on the participant location information;
    providing, by the computing system, an option for remaining participants to continue the scheduled meeting; and
    automatically terminating, by the computing system, the scheduled meeting when no response is received from the remaining participants, wherein automatically terminating the scheduled meeting includes disconnecting the connection between the first resource and the second resource.

2. The computer-implemented method of claim 1, further comprising determining that a first participant is unlikely to be on time to the scheduled meeting based on participant location information associated with the first participant.

3. The computer-implemented method of claim 2, further comprising notifying the first participant of a first available resource proximate to the first participant, based on the determining that the first participant is unlikely to be on time to the scheduled meeting.

4. The computer-implemented method of claim 3, further comprising revising the scheduled meeting to include the first available resource proximate to the first participant.

5. The computer-implemented method of claim 2, further comprising notifying a second participant that the first participant is unlikely to be on time to the scheduled meeting based on the determining that the first participant is unlikely to be on time to the scheduled meeting.

6. The computer-implemented method of claim 1, wherein the automatically initiating the scheduled meeting comprises automatically connecting resources associated with the scheduled meeting without additional user identification of resources.

7. The computer-implemented method of claim 1, wherein the beacon is a low-energy Bluetooth beacon.

8. A system comprising:
    at least one processor; and
    a memory storing instructions that, when executed by the at least one processor, cause the system to perform a method comprising:
        receiving meeting scheduling information from a meeting organizer, the meeting scheduling information comprising meeting time information, participant information, and resource information;
        creating a scheduled meeting based on the meeting scheduling information in calendars of the meeting organizer and one or more participants for the scheduled meeting;
        determining that the one or more participants are in one or more meeting resources using participant location information the determining that the one or more participants are in the one or more meeting resources using the participant location information comprising:
            identifying, through a beacon, mobile devices corresponding to the one or more participants, and
            receiving, through the beacon, user identification information from the mobile devices, wherein the user identification information is based on profiles associated with the one or more participants;
        determining a presence of the meeting organizer in the one or more meeting resources based on the participant location information;
        automatically initiating the scheduled meeting by connecting a first resource associated with the scheduled meeting with a second resource associated with the scheduled meeting;
        determining that a selected number of the one or more participants has left the one or more meeting resources based on the participant location information;
        providing an option for remaining participants to continue the scheduled meeting; and
        automatically terminating the scheduled meeting when no response is received from the remaining participants, wherein automatically terminating the scheduled meeting includes disconnecting the connection between the first resource and the second resource.

9. The system of claim 8, wherein the method further comprises determining that a first participant is unlikely to be on time to the scheduled meeting based on participant location information associated with the first participant.

10. The system of claim 9, wherein the method further comprises notifying the first participant of a first available resource proximate to the first participant, based on the determining that the first participant is unlikely to be on time to the scheduled meeting.

11. The system of claim 10, wherein the method further comprises revising the scheduled meeting to include the first available resource proximate to the first participant.

12. A non-transitory computer-readable storage medium including instructions that, when executed by at least one processor of a computing system, cause the computing system to perform a method comprising:
   receiving meeting scheduling information from a meeting organizer, the meeting scheduling information comprising meeting time information, participant information, and resource information;
   creating a scheduled meeting based on the meeting scheduling information in calendars of the meeting organizer and one or more participants for the scheduled meeting;
   determining that the one or more participants are in one or more meeting resources using participant location information, the determining that the one or more participants are in the one or more meeting resources using the participant location information comprising:
      identifying, through a beacon, mobile devices corresponding to the one or more participants, and
      receiving, through the beacon, user identification information from the mobile devices, wherein the user identification information is based on profiles associated with the one or more participants;
   determining a presence of the meeting organizer in the one or more meeting resources based on the participant location information;
   automatically initiating the scheduled meeting by connecting a first resource associated with the scheduled meeting with a second resource associated with the scheduled meeting;
   determining that a selected number of the one or more participants has left the one or more meeting resources based on the participant location information;
   providing an option for remaining participants to continue the scheduled meeting; and
   automatically terminating the scheduled meeting when no response is received from the remaining participants, wherein automatically terminating the scheduled meeting includes disconnecting the connection between the first resource and the second resource.

13. The non-transitory computer-readable storage medium of claim 12, wherein the method further comprises determining that a first participant is unlikely to be on time to the scheduled meeting based on participant location information associated with the first participant.

14. The non-transitory computer-readable storage medium of claim 13, wherein the method further comprises notifying the first participant of a first available resource proximate to the first participant, based on the determining that the first participant is unlikely to be on time to the scheduled meeting.

15. The non-transitory computer-readable storage medium of claim 14, wherein the method further comprises revising the scheduled meeting to include the first available resource proximate to the first participant.

* * * * *